(12) United States Patent
Chung et al.

(10) Patent No.: US 12,136,874 B2
(45) Date of Patent: Nov. 5, 2024

(54) ELECTRICAL CIRCUIT FOR REDUCING ELECTROMAGNETIC NOISE OR INTERFERENCE IN A POWER CONVERTER

(71) Applicant: City University of Hong Kong, Kowloon (HK)

(72) Inventors: Shu Hung Henry Chung, Kowloon (HK); Kewei Wang, Beijing (CN)

(73) Assignee: City University of Hong Kong, Kowloon (HK)

( * ) Notice: Subject to any disclaimer, the term of this patent is extended or adjusted under 35 U.S.C. 154(b) by 268 days.

(21) Appl. No.: 17/363,650

(22) Filed: Jun. 30, 2021

(65) Prior Publication Data
US 2023/0006542 A1   Jan. 5, 2023

(51) Int. Cl.
*H02M 1/44* (2007.01)
(52) U.S. Cl.
CPC .................................... *H02M 1/44* (2013.01)
(58) Field of Classification Search
CPC .................................................... H02M 1/44
See application file for complete search history.

(56) References Cited

U.S. PATENT DOCUMENTS

2009/0256543 A1 * 10/2009 Yang ................... H02M 1/4208
323/284

OTHER PUBLICATIONS

D. Müller, D. N. Schweitzer, M. Beltle and S. Tenbohlen, "An Active Common Mode EMI Filter Approach introducing Predictive Pulsed Compensation," 2019 International Symposium on Electromagnetic Compatibility—EMC Europe, 2019, pp. 1003-1008, doi: 10.1109/EMCEurope.2019.8872104.
D. Müller, K. Spanos, M. Beltle and S. Tenbohlen, "Improvement of Predictive Pulsed Compensation using Adapted Synchronization," 2020 International Symposium on Electromagnetic Compatibility—EMC Europe, 2020, pp. 1-5, doi: 10.1109/EMCEUROPE48519.2020.9245827.

* cited by examiner

*Primary Examiner* — Jue Zhang
(74) *Attorney, Agent, or Firm* — Renner, Kenner, Greive, Bobak, Taylor & Weber

(57) ABSTRACT

An electrical circuit for reducing electromagnetic noise or interference in a power converter. The circuit includes at least one shunt capacitor arranged to connect with a grounded component of the power converter, wherein the at least one shunt capacitor is further arranged to be driven by an active control signal so as to sink a noise current originating from a noise source to the grounded component of the power converter, wherein the noise source is connected to the grounded component via a capacitive path formed by at least one stray capacitors.

28 Claims, 11 Drawing Sheets

ELECTRICAL CIRCUIT FOR REDUCING ELECTROMAGNETIC NOISE OR INTERFERENCE IN A POWER CONVERTER

TECHNICAL FIELD

The invention relates to an electrical circuit for reducing electromagnetic noise or interference in a power converter, and particularly, although not exclusively, to a logic-controlled active EMI reducing apparatus.

BACKGROUND

Electronic or electrical apparatuses usually operate with predetermined electrical ratings, such as a desired current and/or voltage profile. In general, power converters may be included in an apparatus to convert or regulate an electrical power supplied form an electrical source to the required current and/or voltage. This may include a conversion of AC to DC, a step-up or step-down DC voltage conversion, etc.

Typically, it is required that electric line filters should be included in a primary power conversion stage for smoothing the electrical signal transmitted to and from the electric power source. In some conversion requirement, the line filters may include large inductors and capacitors for handling relatively significant noise and harmonic distortion generated during the operation of the power converters.

SUMMARY

In accordance with a first aspect of the present invention, there is provided an electrical circuit for reducing electromagnetic noise or interference in a power converter, comprising at least one shunt capacitor arranged to connect with a grounded component of the power converter, wherein the at least one shunt capacitor is further arranged to be driven by an active control signal so as to sink a noise current originating from a noise source to the grounded component of the power converter, wherein the noise source is connected to the grounded component via a capacitive path formed by at least one stray capacitors.

In an embodiment of the first aspect, the noise source includes an electrical power converter stage.

In an embodiment of the first aspect, the electrical power converter stage includes at least one switching converter.

In an embodiment of the first aspect, the at least one stray capacitor is connected between a switching node of each of the at least one switching converter and the grounded component.

In an embodiment of the first aspect, the electrical power converter stage comprises a plurality of switching converters, wherein the capacitive path is formed by a plurality of stray capacitors each being individually formed between a switching node of each of the plurality of switching converters and the grounded component.

In an embodiment of the first aspect, the total number of shunt capacitors equals to a total number of switching converters in the electrical power converter stage.

In an embodiment of the first aspect, the noise current $I_Y$ sunk by the at least one shunt capacitor substantially matches with at least one noise current pulses $I_N$ generated by the at least one switching converter during an operation of the power converter.

In an embodiment of the first aspect, the noise current $I_Y$ includes a current waveform substantially matching with the at least one noise current pulses $I_N$.

In an embodiment of the first aspect, the at least one shunt capacitor has a capacitance value of $C_Y$, and the at least one stray capacitor has a capacitance value of $Cs_t$, and wherein the at least one shunt capacitor is further arranged to be driven at a shunt driver voltage at $V_{cd}$ so as to suppress a noise source voltage of the at least one noise current pulses of $V_{sw}$ at the switching node of the at least one switching converter, following a relationship of $V_{cd}/V_{sw}=-C_{st}/C_Y$.

In an embodiment of the first aspect, the at least one shunt capacitor includes a class-Y safety capacitor.

In an embodiment of the first aspect, the at least one shunt capacitor is driven by the active control signal being synchronized to a switching node of each of the at least one switching converter.

In an embodiment of the first aspect, both the active control signal and the noise current includes substantially aligned rising/falling edges.

In an embodiment of the first aspect, further comprising a synchronous shunt driver arranged to provide the active control signal.

In an embodiment of the first aspect, the synchronous shunt driver includes a unified controller arranged to control the at least one switching converter and the at least one shunt capacitor in a synchronized manner.

In an embodiment of the first aspect, the synchronous shunt driver includes at least one dedicated logic controller each being arranged to control a respective one of the at least one shunt capacitor with respect to a synchronization source.

In an embodiment of the first aspect, the dedicated logic controller comprises a synchronizing unit arranged to detect a voltage node associated with the noise source.

In an embodiment of the first aspect, each of the at least one dedicated logic controller is further arranged to control a respective one of the at least one switching converter and the respective one of the at least one shunt capacitor in a synchronized manner.

In an embodiment of the first aspect, the dedicated logic controller includes an input port arranged to receive a gate signal from a PWM controller, a first output port arranged to drive the shunt capacitor, and a second output port arranged to manipulate the switching converter.

In an embodiment of the first aspect, the dedicated logic controller comprises a delay buffer connected between the input port and the first output port.

In an embodiment of the first aspect, the synchronizing unit comprises a delay circuit and a phase detector connected between the input port and the second output port.

In an embodiment of the first aspect, the phase detector comprises a flip-flip and two AND gates.

In an embodiment of the first aspect, the delay circuit includes a resistor-capacitor circuit.

In an embodiment of the first aspect, the synchronous shunt driver further comprising an interfacing stage arranged to directly drive the at least one shunt capacitor.

In an embodiment of the first aspect, the grounded component includes at least one of a chassis, a ground plane, a case and an earth connector of the power supply rail.

In an embodiment of the first aspect, the grounded component is a common ground for one or more components of the power converter.

In accordance with a second aspect of the present invention, there is provided an electrical add-on module for use in a power converter, comprising the electrical circuit in accordance with the first aspect, and a plurality of connectors arranged to connect with a PWM controller for controlling the at least one switching converter, the at least one switching converter, and the grounded component of the power converter.

In accordance with a third aspect of the present invention, there is provided a power converter, comprising an electrical power converter stage including at least one switching converter, a PWM controller arranged to control the at least one switching converter, and the electrical add-on module in accordance with the second aspect.

In an embodiment of the third aspect, the power converter further comprises a chassis and/or an earth connector arranged to operate as the grounded component.

BRIEF DESCRIPTION OF THE DRAWINGS

Embodiments of the present invention will now be described, by way of example, with reference to the accompanying drawings in which.

DETAILED DESCRIPTION

The present invention relates to the mitigation of electromagnetic interference (EMI) in switching mode power converter systems.

The inventors, through their own research, trials and experiments, devised that switching mode power converter may be used in electric power conversion systems for low to mid-power applications. Its key to high-efficiency power conversion is the utilization of the fast switching of power semiconductor devices, like MOSFETs and IGBTs. Consequently, fast and strong voltage fluctuations are generated. Typically, a primary semiconductor switch has three nodes: a control node like the gate of a MOSFET, a switching node like the drain of a MOSFET, and a reference ground node like the source of a MOSFET. The role of the drain and source may exchange. Preferably, the reference ground is a "quiet" node with relatively stable voltage referring to the earth, while the switching node is a "noisy" one that exhibits strong fluctuations.

Practically, there are some stray capacitive paths from the converter to the earth. Noise generated by the converter flows to the earth via the stray paths and enters the power network.

For example, a power converter may be enclosed by a conductive case made from metal, which is an equipotential surface. Then, there are stray capacitive paths from the converter to the case. Such a conductive case has 1) a stray capacitive path to the earth if it is floating, or 2) a short path to the earth if it is connected to an earth line. For safety, the floating case is usually enclosed by insulating materials.

Figure 1:
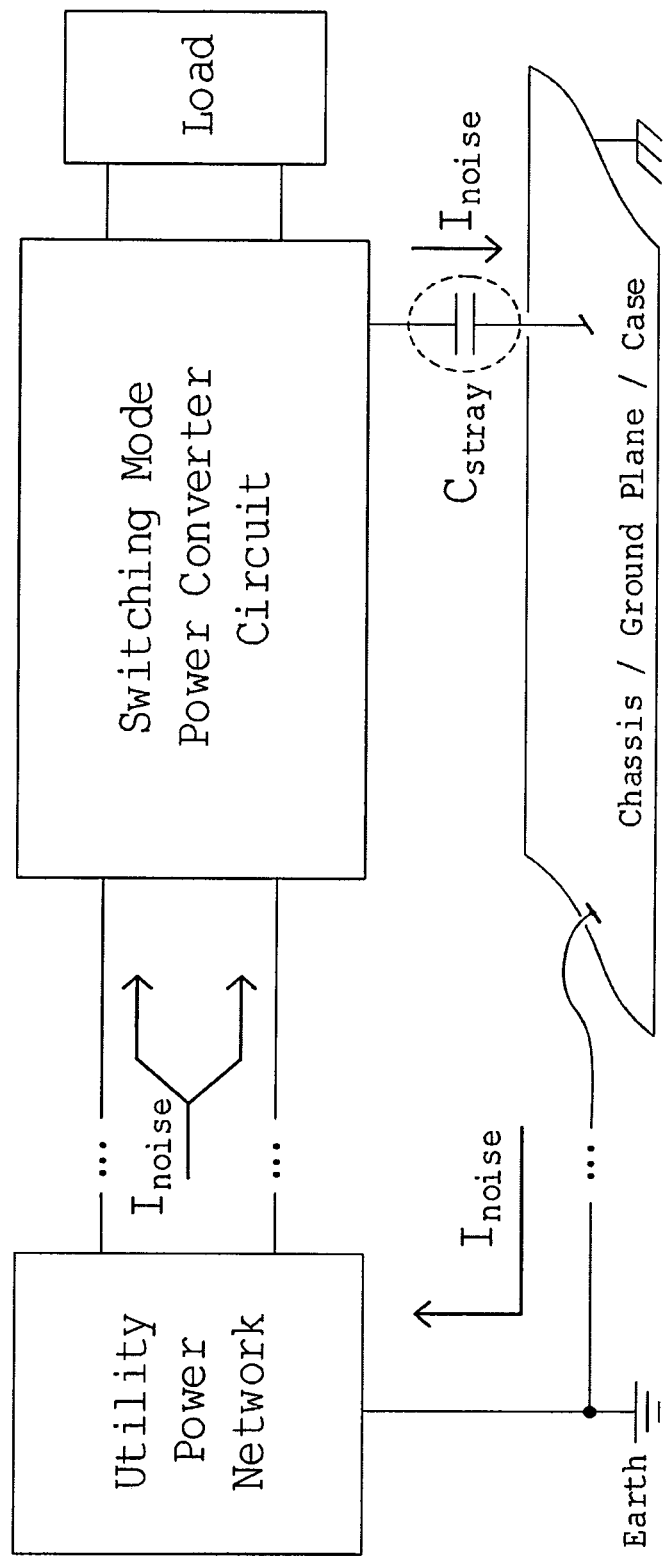
FIG. 1 is a diagram showing a typical CM disturbance propagation path of a switching mode power converter in a power network.

The high-frequency fluctuations propagate through the paths mentioned above to the earth and the power network. It is regarded as a common-mode (CM) disturbance in EMI studies. Referring to FIG. 1, there is shown an exemplary CM disturbance path conducted from the semiconductor switch(es) to the earth through the stray capacitors and then back to the switch through power input rails. The disturbance can be observed by measuring the line current or the line-to-earth voltage.

For suppression of the disturbance from switching converters, EMI filters may be added. In mitigating the conducted CM disturbance, there are two methods: 1) use chokes to form a high-impedance path for high-frequency disturbance propagation, i.e., the common-mode choke; 2) use capacitors to shunt the disturbance and make it circulate within the converter instead of flooding outwards, i.e., the Y-cap. These two methods are usually applied simultaneously.

Without wishing to be bound by theory, the drawback of a choke is the bulkiness and the weight. The drawback of a Y-cap is the effect of increasing AC leakage current to the earth. The leakage current is hazardous if it flows through a human body. Even though the leakage current is conducted to the earth without flowing through the human body, an overwhelming amount of current will trip a residue current device (RCD), which leads to a power cutoff instantly. Therefore, the Y-cap capacitance is usually very limited.

Active EMI filtering circuits may be used instead for reduction of filter size and enhancing of filter performance. For example, the active filtering technique based on fast linear amplification may be applied. The noise signal is amplified and then injected into the converter system to impose a stronger filter response than passive elements. As an example, an active-enhanced Y-cap can circulate the high-frequency noise more effectively.

Meanwhile, the capacitance can be small enough to avoid excessive leakage current. The core part of prior-art active filtering techniques is the fast amplifier, which requires high bandwidth, high gain, and high fidelity. Such an idealized amplifier is hard to implement and stabilize. Moreover, faster amplifiers usually consume higher power.

In accordance with the preferred embodiment of the present invention, there is provided an active EMI reduction method using a synchronization program and waveform-matching hardware design. It is based on the knowledge of the noise source behavior.

Preferably, based on the knowledge of a switching node waveform, an active synchronous noise shunt can be built. The shunt utilizes switching actions synchronized and aligned with the converter's switching node(s) to make the disturbance current circulate inside a converter. Then, the EMI emission is nulled.

The present embodiments show the circuit building techniques, which mimic the common-mode noise generation process in a switching mode power converter, to absorb the noise current. The sync-shunt employs logic or digital circuits to control. It sinks the noise current through a capacitor.

Preferably, an active filtering technique may be implemented without using high-speed linear amplifiers. The Y-cap driver is switching at the same frequency as the power converter, which is relatively low. Moreover, the only component to sustain high voltage is the Y-cap. Therefore, the cost, as well as power consumption, are low. Because of the simplicity of the control and driving circuit, the hardware size can be made compact. The controller is easy to be integrated into an IC or implemented with a digital controller.

Figure 2:
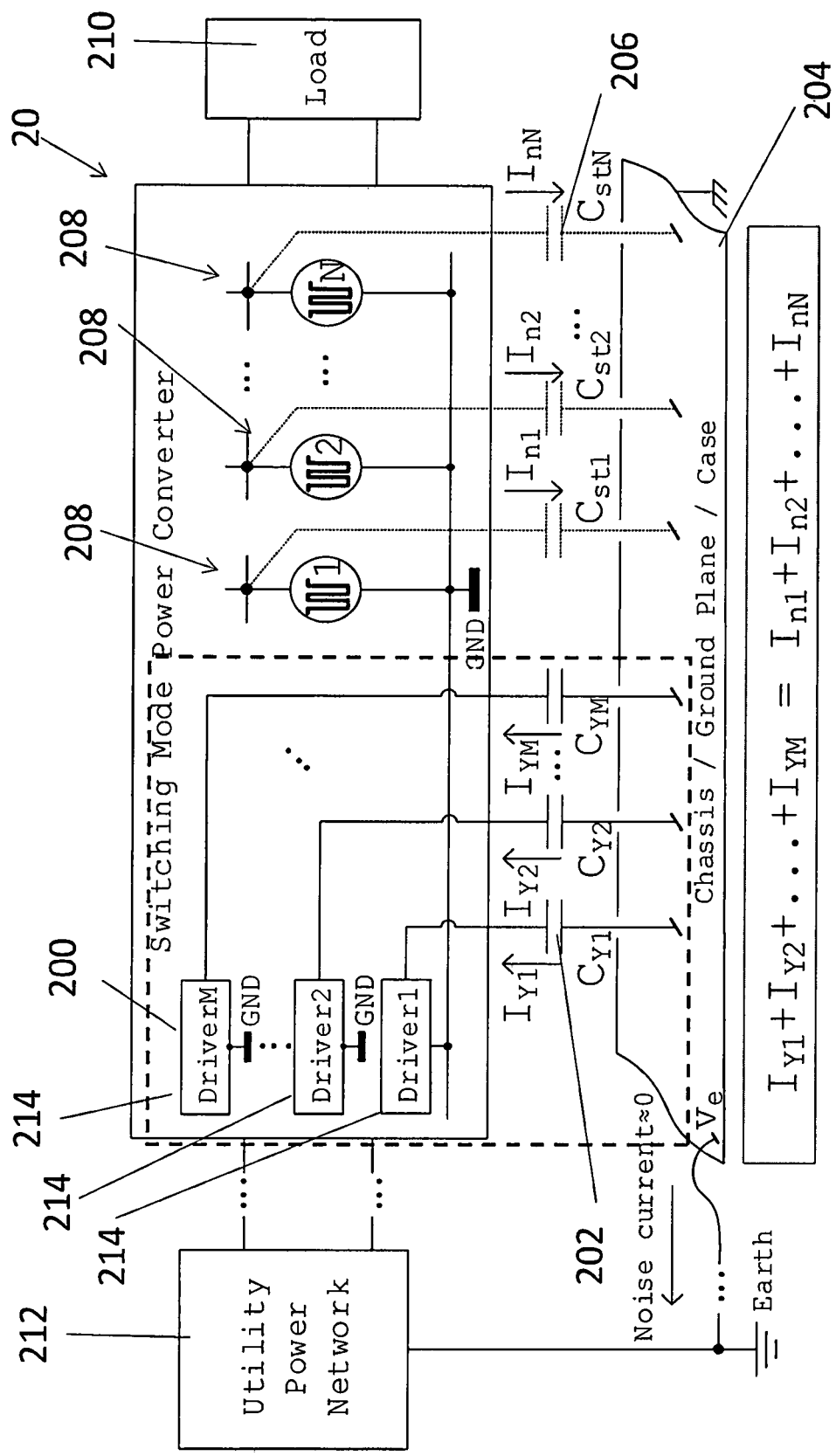
FIG. 2 is a diagram showing a power converter in accordance with an embodiment of the presented invention.

With reference to FIG. 2, there is shown an embodiment of an electrical circuit 200 for reducing electromagnetic noise or interference in a power converter 20, comprising at least one shunt capacitor 202 arranged to connect with a grounded component 204 of the power converter, wherein the at least one shunt capacitor 202 is further arranged to be driven by an active control signal so as to sink a noise current originating from a noise source to the grounded component 204 of the power converter, wherein the noise source is connected to the grounded component via a capacitive path formed by at least one stray capacitors 206.

In this embodiment, the noise source includes an electrical power converter stage, which further includes N switching converters 208 for outputting N portions/channels of electrical power to the load 210. Similar to the example in FIG. 1, the power converter also includes a chassis 204 that houses the converter, thus, stray capacitive paths are formed from the converter 208 to the earth as described earlier, however such noise current may be suppressed by actively sinking the noise current to the earth but not recycling the noise to the utility power network 212 or back to the power converter via the utility power network 212.

The circuit 200 may be provided as an electrical add-on module comprising a plurality of connectors arranged to connect an existing power converter having a PWM controller for controlling the switching converter 208 and the grounded component 204 of the power converter 20, the connectors are further connected to the shunt capacitors 202, and a synchronous shunt (sync-shunt) driver 214 for providing the active control signal to the shunt capacitor 202. Alternatively, the circuit 200 may be provided as built-in module in a power convertor 20.

Preferably, the sync-shunt driver 214 generates a programmed signal to sink the exact current from the noise source(s) through capacitors. Such a driving signal is programmed based on the knowledge of the primary noise source; it is not derived by real-time high-speed amplification of the noise signal.

For example, referring to FIG. 2, the sync-shunt can be implemented with a capacitor, or multiple capacitors 202, each being provided with an individual driver 214. The driver may be connected with a common reference ground with the noise source(s), such as the primary switching MOSFET or IGBT in a power converter 20. In addition, for the effectiveness of the invention, a conductive case, chassis, or plane may operate as the grounded component 204 of the power converter which collects the common-mode disturbance from the switching node. The sync-shunt should be connecting the conductive case 204 and the converter circuit 208.

In this example, the capacitor 202 has one end connected to the grounded component 204, such as a conductive case, chassis, or plane associated with the power converter 20. The other node of the capacitor 202 connects to the output of the driver 214, which is a voltage source programmed to mimic the switching operations of the primary switch (which controls the transistor in the switching network), but with a much lower voltage amplitude. Alternatively, the grounded component 204 may be an earth connector of the power supply rail.

Preferably, the noise current $I_Y$ sunk by the at least one shunt capacitor 202 substantially matches with at least one noise current pulses $I_N$ generated by the at least one switching converter 208 during an operation of the power converter 20. For example, noise current pulses $(I_{n1}+I_{n2}+ \ldots + I_{nN})$ are generated by the noise sources through stray capacitors 206 towards the conductive case 204. The drivers 214 in the shunts generate current pulses $(I_{Y1}+I_{Y2}+ \ldots +I_{YM})$ in a similar fashion but opposite direction, i.e. the noise current $I_Y$ includes a current waveform substantially matching with the at least one noise current pulses $I_N$.

Suppose the exact noise current arriving at the case 2 is lifted by the sync-shunts, i.e., $I_{n1}+I_{n2}+ \ldots +I_{nN}=I_{Y1}+I_{Y2}+ \ldots +I_{YM}$, the noise current escaping from the case to the earth is nulled. Then, the common-mode noise is largely reduced.

There can be multiple noise sources, stray capacitances, and sync-shunts in one converter system. For example, the electrical power converter stage in FIG. 2 comprises a plurality of switching converters 208, wherein the capacitive path is formed by a plurality of stray capacitors 206 each being individually formed between the switching node of each of the plurality of switching converter 208 and the grounded component 204. However, a person skilled in the art would know that multiple stray capacitors may also be lumped into one equivalent capacitor.

Preferably, a class-Y safety capacitor may be used as the shunt capacitor 202. A person skilled in the art knows that a Y-cap is typically a safety capacitor across those rails with a high potential difference. In this disclosure, the capacitor 202 in the sync-shunt is also referred to as a Y-cap, and the driver in the shunt is referred to as the Y-cap driver. Alternatively, other types or classes of safety capacitor which may handle such a high potential differences and/or current pulses may be used.

The effect of the EMI reduction depends on the matching of the total current sunk by the shunts $(I_{Y1}+I_{Y2}+ \ldots +I_{YM})$ and the total current generated by the noise sources $(I_{n1}+I_{n2}+ \ldots +I_{nN})$. A person skilled in the art would be aware that unwanted mismatch may also exists therefore the EMI filtering circuit may work even though the matching is imperfect.

In a simplified embodiment, there may be only one equivalent stray capacitor and one sync-shunt capacitor, i.e., M=1, N=1. Then, a perfect cancellation of the noise current $(I_Y=I_n)$ is equivalent to a perfect matching of the AC voltages across the two capacitors. A "perfect matching" means the voltage ratio is described by the equation $$\tilde{V}_{C\_Y}/\tilde{V}_{C\_st}=-C_{st}/C_Y \qquad (1)$$

For example, a noise source voltage may be a square pulse train across the primary semiconductor switch. Therefore, the Y-cap voltage should also be a square pulse train. For minimal CM noise current, the square pulse trains should be synchronized with their rising/falling edges aligned. The proper voltage ratio of the square pulse trains is also required.

In one preferred embodiment, the voltage of the conductive case, $V_e$, is nearly a constant referring to the circuit ground GND. Thus, the switching node voltage referring to GND ($V_{sw}$) and the Y-cap driver voltage referring to GND ($V_{cd}$) should be perfectly matching if the CM noise current is to be eliminated. This is described by an equation similar to (1):

$$\tilde{V}_{cd}/\tilde{V}_{sw} = -C_{st}/C_Y \quad (2)$$

In this example, power converter includes multiple (N, at least one) noise sources, each associated with a stray capacitor ($C_{st1}$ to $C_{stN}$) and injecting a common-mode noise current ($I_{n1}$ to $I_{nN}$). There are multiple (M, at least one) sync-shunts, each having a driver (Driver 1 to Driver M) and a Y-cap ($C_{Y1}$ to $C_{YM}$), sinking a common-mode current ($I_{Y1}$ to $I_{YM}$). Suppose the total current sunk by the shunts equals the total noise current sourced through the stray capacitors, the noise current is circulated locally. Therefore, the disturbance going outwards is zero.

Figure 3:
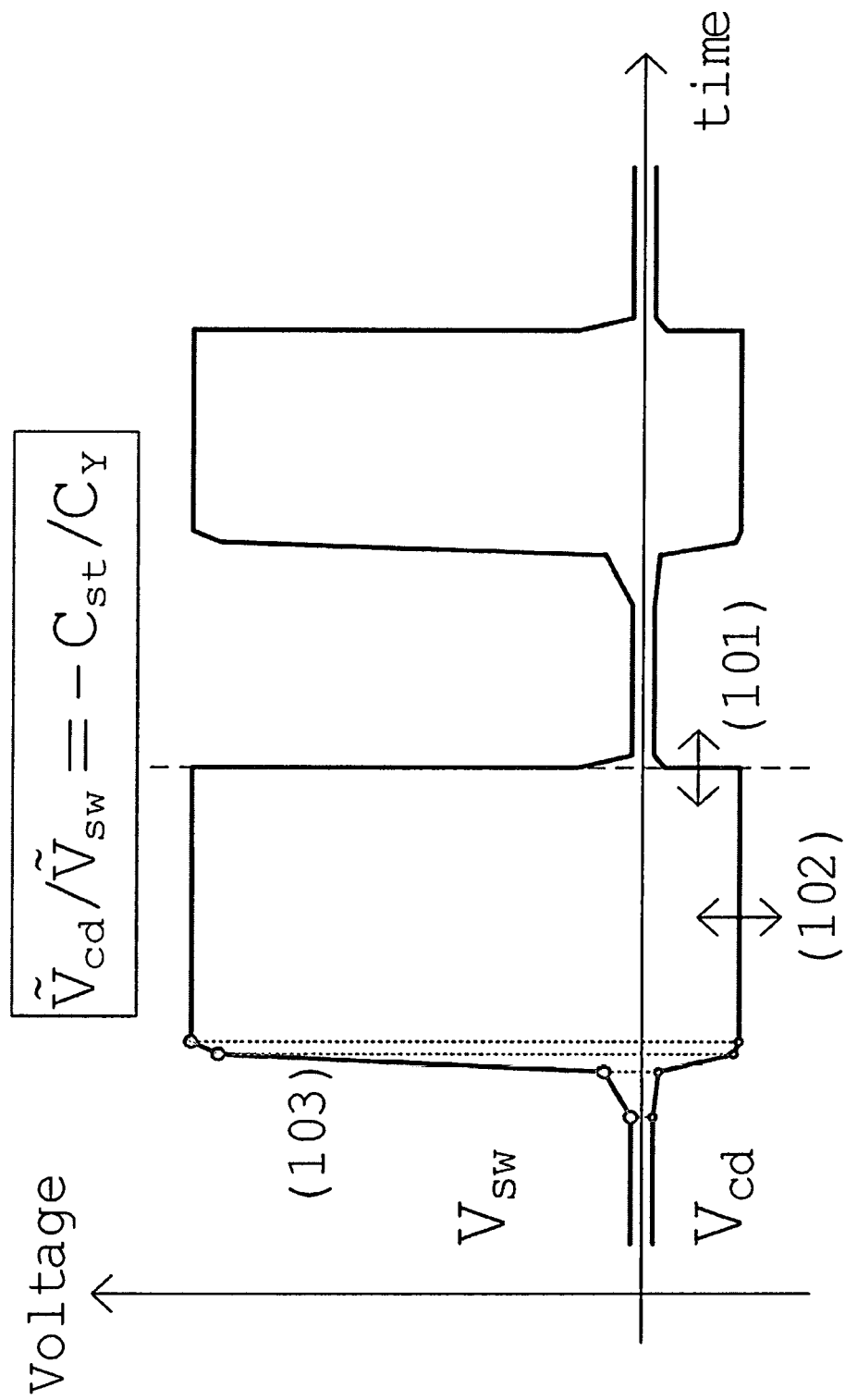
FIG. 3 is a plot illustrates "perfect matching" of $V_{cd}$ and $V_{sw}$. The waveform characteristics are the same except for the voltage scale.

The relation is further illustrated in FIG. 3. The equation indicates that a small shunt driver voltage can be used to mimic a large noise source voltage by having the Y-cap larger than the stray capacitor. This is easy to achieve because stray capacitors are usually very small.

Preferably, the at least one shunt capacitor is driven by the active control signal being synchronized to a switching node of each of the at least one switching converter. For example, both the active control signal and the noise current includes substantially aligned rising/falling edges.

There are three major aspects in matching the square pulses $V_{cd}$ with $V_{sw}$. First, the synchronization and edge alignment by the control circuit (101); second, setting the proper voltage level of the $V_{cd}$ (102); third, the fine details of $V_{cd}$ such as slopes of the rising/falling edges (103). In one embodiment, the synchronization and edge alignment are handled by a logic circuit. In one embodiment of the voltage level setting, a supply voltage with the wanted value is given to the driver. In one embodiment of the edge shaping, simple passive RC circuits are used. Because the key toggling actions are programmed by the logic timing circuitry, the invention can be considered a logic-controlled active filter.

A person skilled in the art would understand there can be unwanted or intended misalignment time intervals; the toggling of the Y-cap driver output $V_{cd}$ may either lead or lag that of the switching node voltage $V_{sw}$. The misalignment time intervals are very short comparing to the converter's switching period. There can also be a mismatch in other aspects, either unwanted or intended, including the square pulse voltage level or detailed waveform characteristics such as the rising/falling edges.

A person skilled in the art would know that the presented synchronous shunt can remain effective with a certain level of imperfections, like a slight mismatch of the time alignment, edge shaping, or voltage level setting.

In one embodiment, the Y-cap is driven by a sequential logic control circuit, which takes the primary switch's control signal as the synchronization source. A person skilled in the art would understand that the Y-cap driving signal may be leading its synchronization source signal.

In one embodiment, the Y-cap is driven together with the primary switch by a unified controller. This controller arranges the time alignment between the shunt and the primary switch; the Y-cap driving signal is not derived from the primary switch gate signal.

In one preferred embodiment, there is an interfacing stage between the control circuit and the Y-cap to enhance the driving capability. In one embodiment, a logic level translating circuit is also needed for a wanted square pulse voltage level.

In one embodiment, the interfacing stage is a commercial MOSFET driver IC to providing the driving capability and logic level translation at the same time.

In one embodiment, the interfacing stage is a discrete transistor-based circuit.

In one embodiment, there are delay elements in the logic control circuit, which are RC circuits.

In one embodiment, the time delay in the control circuit can be adjusted automatically to serve a better EMI reduction.

In one embodiment, the rising/falling characteristics of the driving voltage $V_{cd}$ is defined by using passive components on the driving path, such as resistors, capacitors, and inductors, to better match the characteristics of the noise source.

In one embodiment, the rising/falling characteristics of the driving voltage $V_{cd}$ can be adjusted automatically by active circuitry to serve a better EMI reduction.

In one embodiment, the voltage level of the Y-cap driving voltage $V_{cd}$ can be adjusted automatically to serve a better EMI reduction.

Figure 4A:
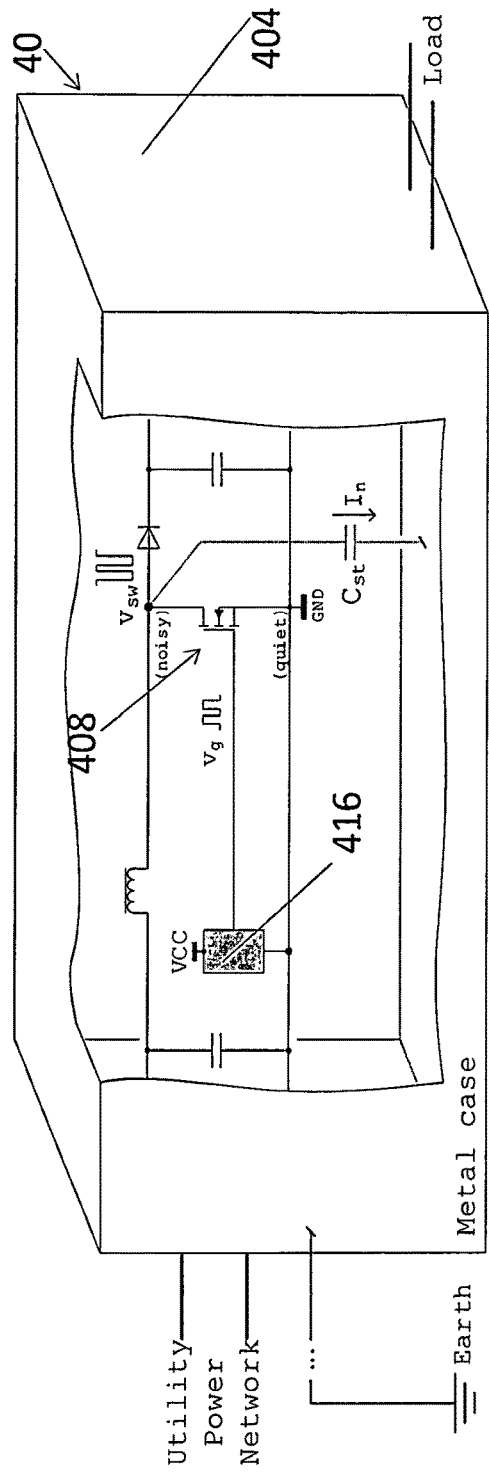
FIGS. 4A and 4B illustrate respectively an example boost converter with an analog PWM controller and an embodiment of the application of the sync-shunt in the boost converter, in this example, the sync-shunt has a dedicated logic controller.

With reference to FIG. 4A, there is shown an example boost converter 40 with a conductive case 404. The converter 40 has only one primary semiconductor switch 408 (a MOSFET) and is controlled by a commercial analog PWM controller 416, which has an integrated MOSFET driver. The analog PWM controller 416 generates a square pulse train as the gate signal $V_g$ for the MOSFET 408.

Figure 4B:
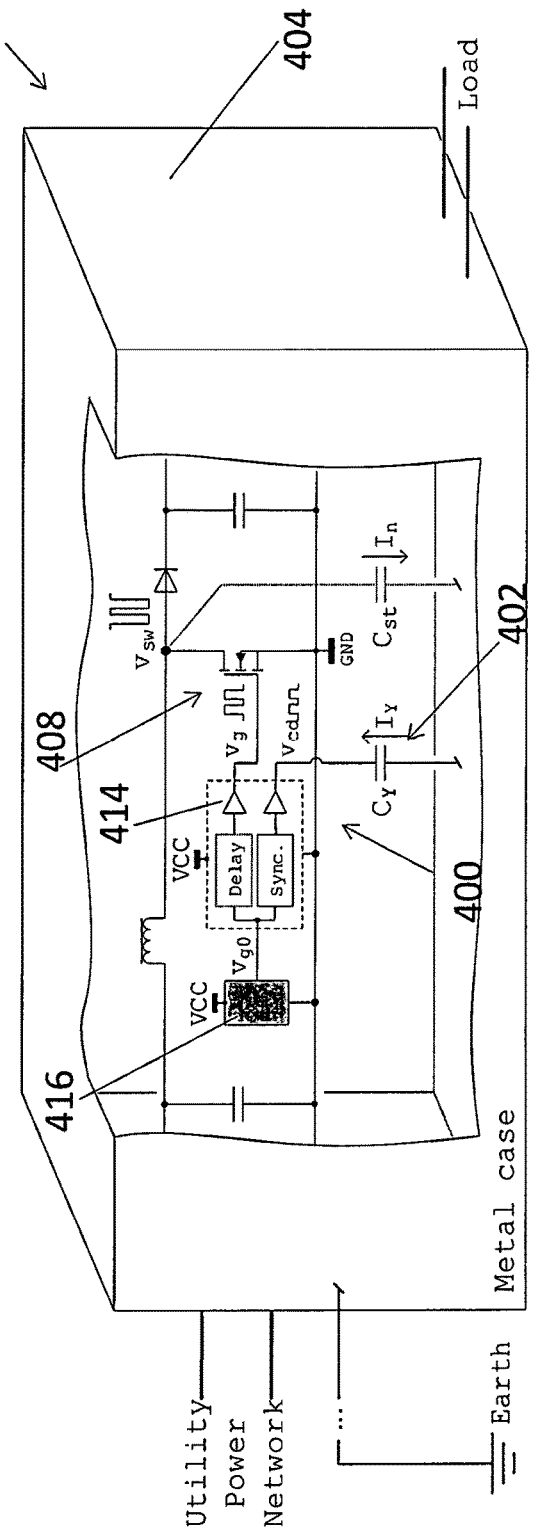

To suppress noise currents generated by the boost converter, further referring to FIG. 4B, the electrical circuit 400 may be installed in the boost converter 40' to reduce the CM noise. An add-on module with one input and two outputs is inserted in the driving path. In this example, the sync-shunt driver 414 may be a dedicated logic controller arranged to control a respective one of the shunt capacitors with respect to a synchronization source, such as the switch output node where the noise pulses originate.

In this example, the dedicated logic controller 414 includes an input port arranged to receive a gate signal from a PWM controller 416, a first output port arranged to drive the shunt capacitor 402, and a second output port arranged to manipulate the switching converter 408. In addition, the dedicated logic controller 414 further comprises a synchronizing unit arranged to detect a voltage node associated with the noise source, such that each of the at least one dedicated logic controller 414 may control a respective one of the at least one switching converter 408 and the respective one of the at least one shunt capacitor 402 in a synchronized manner, as described earlier referring to FIG. 3.

Referring back to FIG. 4B, the input is the gate signal $V_{g0}$ from the analog PWM controller, as the synchronization source. The outputs are the primary switch driving signal $V_g$ and the Y-cap driving signal $V_{cd}$. In the upper branch, $V_{g0}$ is first delayed and sent out by a driver as $V_g$. Such a delay of the gate signal is to wait briefly for the synchronization unit to proceed, because of the unintentional latency. The lower branch is the synchronization unit, in which, $V_{g0}$ is also delayed and sent out by a driver as $V_{cd}$, while the delay time is designed with the best effort so that $V_{cd}$ is aligned to $V_{sw}$. Preferably, the fine details of the $V_{cd}$ waveform, such as the rising/falling characteristics, are also tuned to match $V_{sw}$ so that $I_n = I_Y$.

Figure 5:
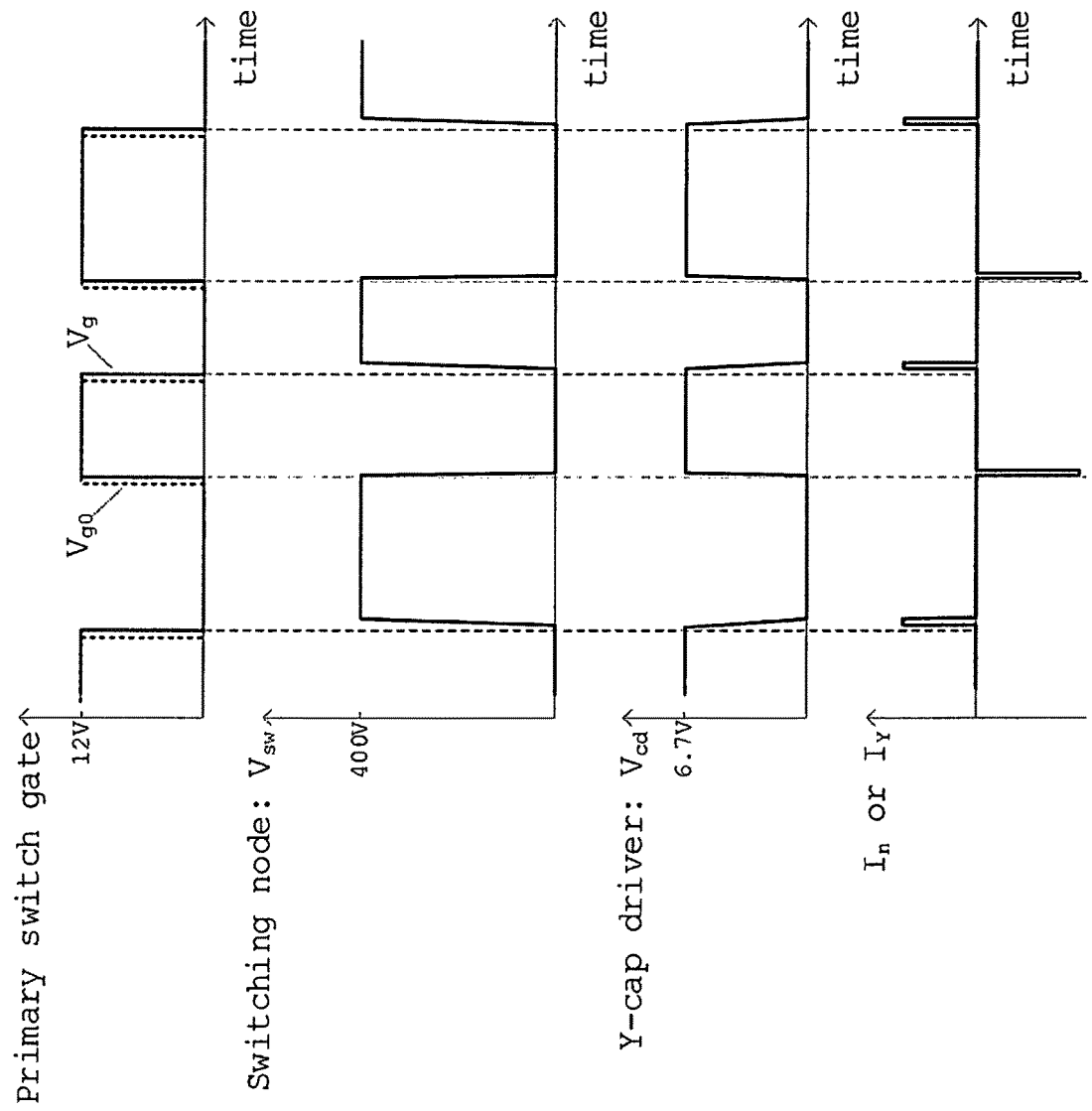
FIG. 5 depicts the key waveforms in FIG. 4B.

Refer to the timing diagram in FIG. 5, there is shown the timing relations of the controller output gate signal $V_{g0}$, the primary gate voltage $V_g$, the switching node voltage $VS_W$, the Y-cap driving voltage $V_{cd}$, and the corresponding noise current. The $V_g$ is a slightly delayed version of $V_{g0}$. The $V_g$ controls the primary switch. Therefore, $V_{sw}$ is a high-voltage waveform slightly delayed with an inverted phase. It has different rising/falling characteristics with $V_g$. $V_{cd}$ is also a slightly delayed version of $V_{g0}$; however, it is aligned to $V_{sw}$ with the detailed waveform characteristics matched as in equation (2). The transition edges of $V_{sw}$ generate $I_n$. The transition edges of $V_{cd}$ generate $I_Y$. By aligning and matching $V_{cd}$ to $V_{sw}$, $I_Y$ is made equal to $I_n$.

Figure 6:
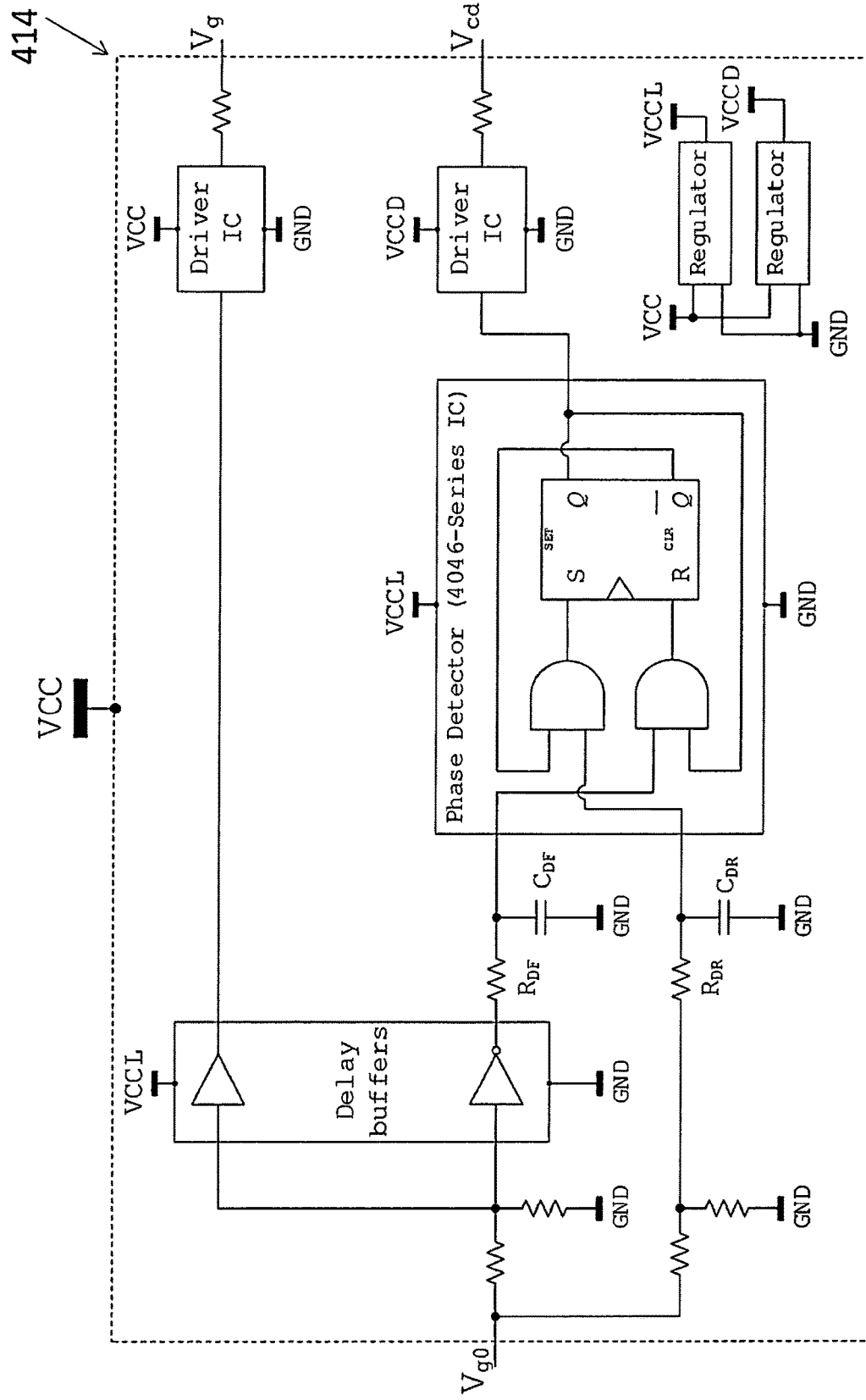
FIG. 6 is a schematic diagram showing the circuit of an example embodiment of the sync-shunt controller in FIG. 4B.

With reference to FIG. 6, there is shown an embodiment of the driver circuitry of the add-on module 414. In this embodiment, in the upper branch, the $V_{g0}$ is delayed through a delay buffer and sent to a driver IC. In the lower branch, the rising and falling edges of $V_{g0}$ are delayed separately to align with the $V_{sw}$. The rising edges are delayed using $R_{DR}$ and $C_{DR}$. The falling edges are delayed using $R_{DF}$ and $C_{DF}$. The delayed edges are then captured and assembled into the wanted pulse train by a phase detector, which is built with a flip-flop and two AND gates. Then, the pulse train is sent to the Y-cap using a driver IC. The supply voltage of the driver IC is tuned to provide the wanted $V_{cd}$ amplitude for the best EMI reduction effect. The fine details of the rising and falling edges of $V_{cd}$ are adjusted using a passive circuitry connected to the Y-cap; the simplest implementation is using a resistor to define the rising/falling slew rates at the same value.

The inverting and non-inverting buffers in FIG. 6 can be implemented using a buffer IC, such as 74LS31. The RC delay elements should have low tolerances for stable delay timing. They can also be implemented by semiconductor delay elements. The phase detector can be implemented with an IC such as the 4046 series. The two drivers can be general-purpose MOSFET driver ICs. The supply voltage of the MOSFET driver, VCC, can be the same as that of the analog PWM controller, for example, 12V. The supply voltage of the Y-cap driver, VCCD, may have a different value, for example, 6.7V. The supply voltage of the logic circuit, VCCL, may have a different lower value, for example, 5V.

The gate signal from the analog PWM controller $V_{g0}$ is taken as the synchronization source because $V_{sw}$ is naturally well-synchronized with the $V_g$. A person skilled in the art would understand the synchronization source of the logic control circuit may be some other node(s), for example, the $V_{sw}$ node. Alternatively, the synchronization source signal can be taken from a heatsink, or through contactless methods, like using an antenna.

In one embodiment, there is no delay buffer element used in driving the primary switch, i.e., $V_{g0}=V_g$. The analog PWM controller drives the primary switch directly; no waiting is needed. In such cases, the unintentional latency in the synchronization unit is short enough to avoid $V_{cd}$ lagging too much after $V_{sw}$.

Preferably, the grounded component is a common ground for one or more components of the power converter, e.g. as shown in FIG. 4B, the analog PWM controller and the add-on module have common ground GND with the primary semiconductor switch. In addition, the analog PWM controller and the add-on module share a common power supply rail.

A person skilled in the art understands that a power converter with multiple primary switches may have only one noisy node. For example, in a totem-pole full bridge PFC converter, there are four switches and two switching nodes. However, only one node is switched in high frequency, while the other is commutating in a much lower frequency. Slow commutation is nearly quiet from the EMI perspective. In such converters, the single sync-shunt configuration in FIG. 4 can be applied.

Figure 7:
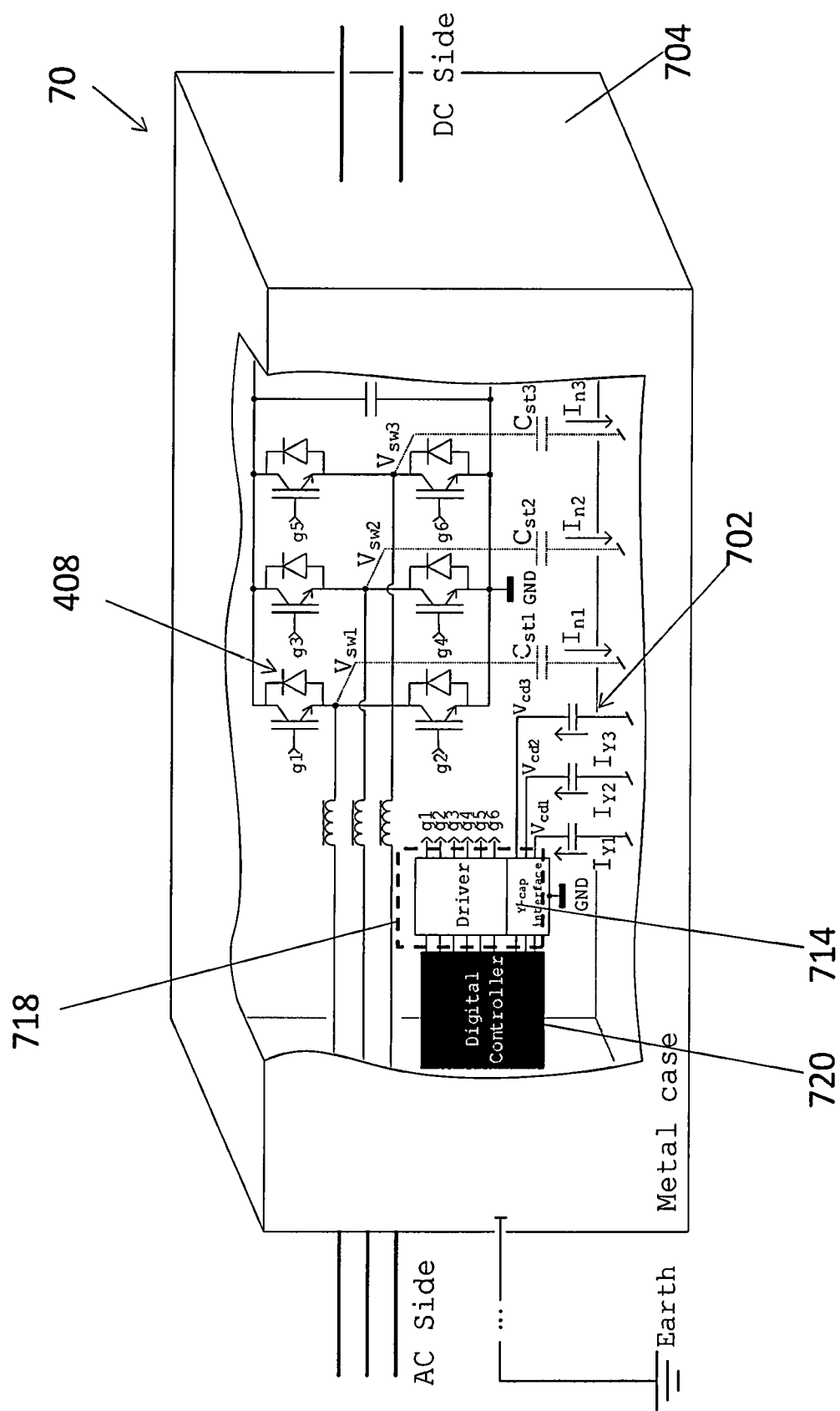
FIG. 7 illustrates an alternative embodiment of the sync-shunt in a three-phase, full bridge converter with a unified digital controller.

In an alternatively embodiment, referring to FIG. 7, there is shown a power converter 70 having multiple primary switches 708 and multiple high-frequency, noisy switching nodes, such as a three-phase full bridge power converter 70. In this embodiment, the converter employs a digital controller, and the synchronous shunt driver includes a unified controller 718 arranged to control both the switching converter 708 and the shunt capacitor 702 in a synchronized manner.

Preferably, the unified controller 718 may manage the six switching IGBTs 708 as well as the sync-shunt(s). A driver circuit module 718 is used to deliver the control signals from the digital controller to the IGBTs 708. Unlike the embodiment in FIG. 4B, there is no dedicated logic controller for a sync-shunt; the function of the logic controller is implemented within the digital controller 718 by a software program. An interfacing stage 720 may be included for directly driving the at least one shunt capacitor 702, such as a gate driver IC 714 for driving Y-caps, is used to deliver the control signals from the digital controller to the Y-caps. The fine details of the $V_{cd}$ waveform, like slew rates and the pulse train amplitude, may still be managed by analog circuitry to better match the $V_{sw}$ waveform. Similar to the previous examples, the shunt capacitors are connected to the metal case or the grounded component 704.

Figure 8:
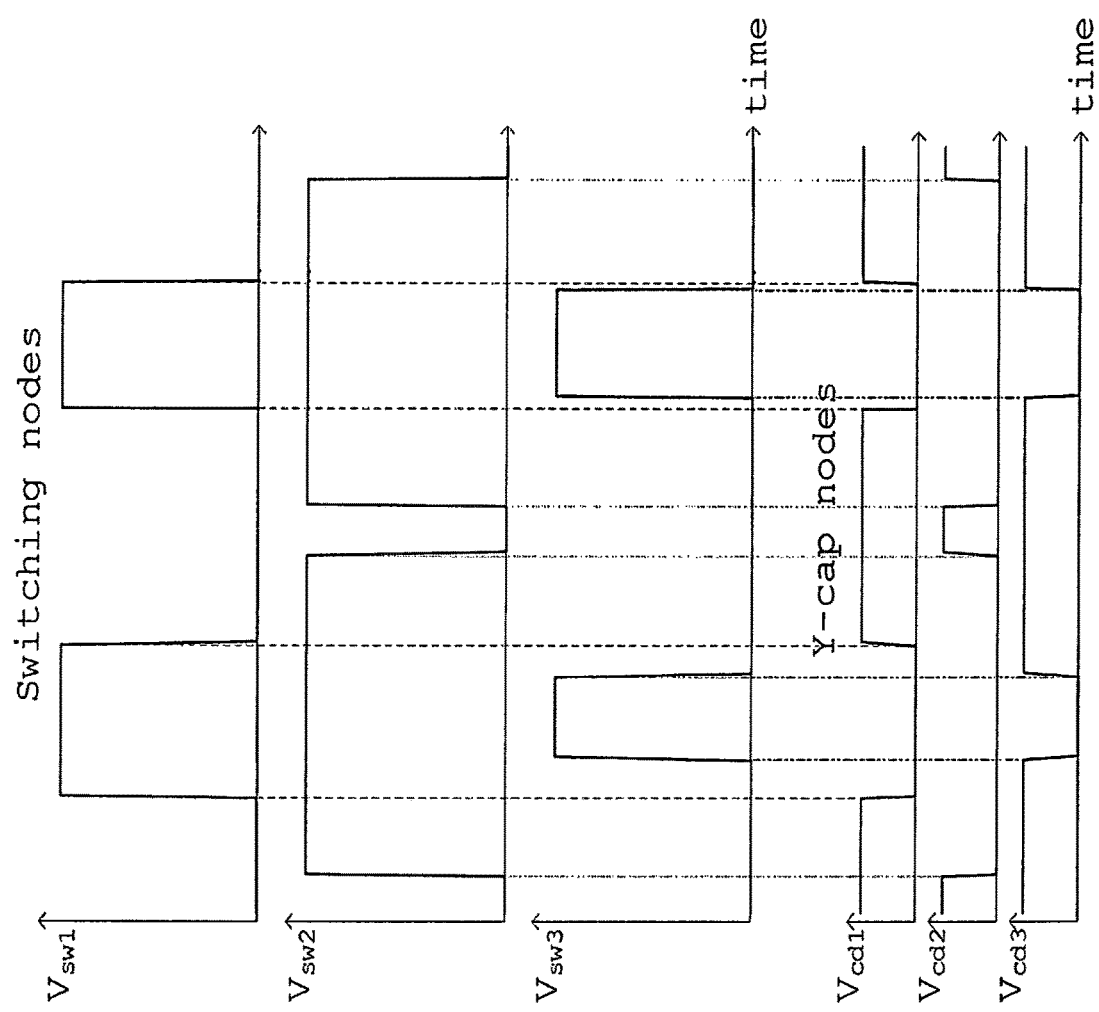
FIG. 8 depicts the key waveforms in FIG. 7. The timing relations of the switching node voltages $V_{sw1-3}$ and the Y-cap driving voltage $V_{cd1-3}$ are shown.

A person skilled in the art knows that a typical three-phase full bridge has three noisy switching nodes. In one embodiment, there are three sync-shunts used, each aligns to one primary switching node, so that $I_{Y1}+I_{Y2}+I_{Y3}=I_{n1}+I_{n2}+I_{n3}$. A timing diagram of the switching nodes and sync-shunt driving nodes is shown in FIG. 8. This embodiment shows that the presented invention can be easily applied in a digitally controlled, advanced power converter system.

A person skilled in the art would understand that the time alignment design in the control circuit or program takes into account the latency caused by the logic elements, the slew rate control elements, and the Y-cap interfacing stage.

In one embodiment, one sync-shunt may be referring and reacting to multiple switching nodes in a converter system to mitigate multiple noise current at the same time.

A person skilled in the art would understand that noise source voltage $V_{sw}$ waveform may not be a square pulse train. $V_{cd}$ can be programmed to match the shape of $V_{sw}$ accordingly. For example, the $V_{sw}$ waveform is a half-sine wave, and then the $V_{cd}$ is programmed as a half-sine wave to match $V_{sw}$.

A person skilled in the art would understand the wanted exact waveform matching to the noise source may not be easily achieved. The $V_{cd}$ can be programmed in another shape to approximate the $V_{sw}$ spectrum in the frequency domain as far as possible. For example, $V_{sw}$ waveform is a half-sine wave, and then the $V_{cd}$ can be programmed as a triangular wave.

These embodiments may be advantageous that the electrical circuit arrangement may effectively suppress noise pulses generated by the switches in a switching convertor. Compared to other active EMI filters, the preferred embodiments are more stable, lower-cost, lower-power, easier to integrate, and possibly more compact. Compared to passive EMI filters, the preferred embodiments are more compact and more stable.

The inventors has evaluate the performances of the electrical circuit in accordance with the embodiments of the present invention.

Figure 9:
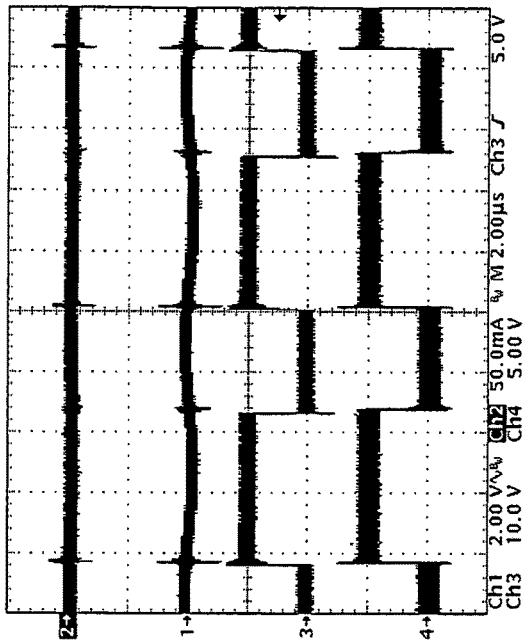
FIG. 9 to FIG. 12 are oscilloscope waveforms captured in a prototype circuit of the invention configured as in FIG. 4B.
Figure 10:
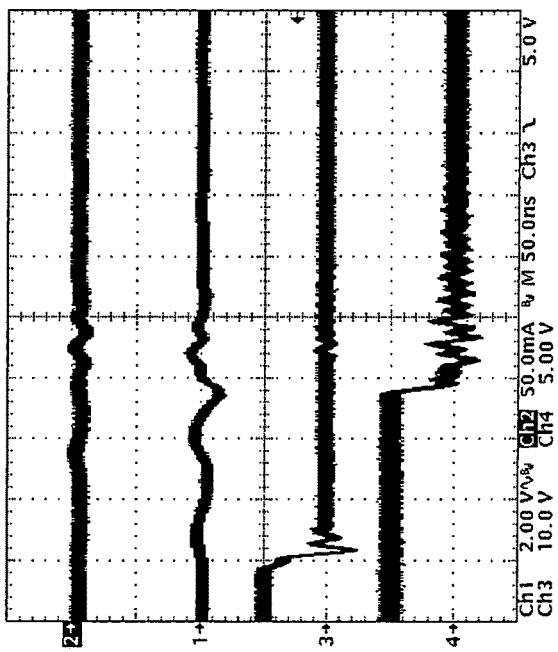
Figure 11:
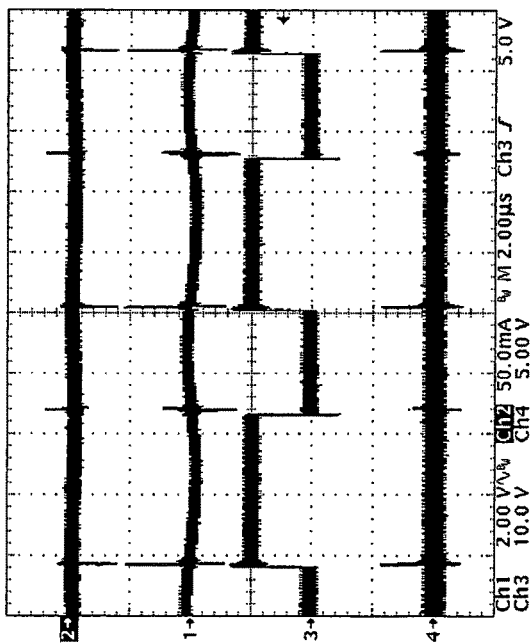
Figure 12:
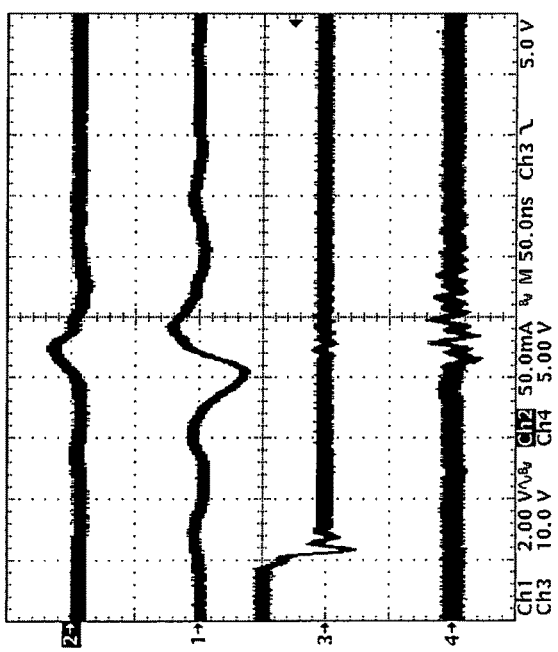

FIG. 9 to FIG. 12 are oscilloscope waveforms captured in a prototype circuit of the invention configured as in FIG. 4B. There is no common mode choke. Channel #1 is the voltage between the converter GND and the metal case. Channel #2 is the earth line current flowing from the metal case to the earth. A person skilled in the art would know that the conducted CM noise can be observed in Channel #1 and Channel #2. Channel #3 is the primary gate voltage $V_g$. Channel #4 is the Y-cap driving voltage $V_{cd}$. In FIG. 9 and FIG. 11, the sync-shunt is disabled, i.e., the driver IC pulls the $V_{cd}$ directly to the GND, and $C_Y$ becomes a passive shunt capacitor. Therefore, Channel #4 does not see a logic signal. In FIG. 10 and FIG. 12, the shunt is enabled. FIG. 9 and FIG. 10 shows an overview of the circuit operation. The $V_g$ turns on or off the primary switch, which consequently produces spikes in Channel #1 and Channel #2. It can be observed via comparison that in FIG. 10, with the sync-shunt enabled, the strength of the spikes in Channel #1 and Channel #2 is reduced. The time alignment relationship between $V_g$ and $V_{cd}$ in FIG. 5 is also reflected in the measurement waveforms. FIG. 11 and FIG. 12 show the detailed waveform of the primary switch turn-off transient. It can be observed via comparison that in FIG. 12, with the sync-shunt enabled, the strength of the spikes in Channel #1 and Channel #2 is reduced. It can also be observed that there is a time difference between $V_g$ and $V_{cd}$.

Figure 13:
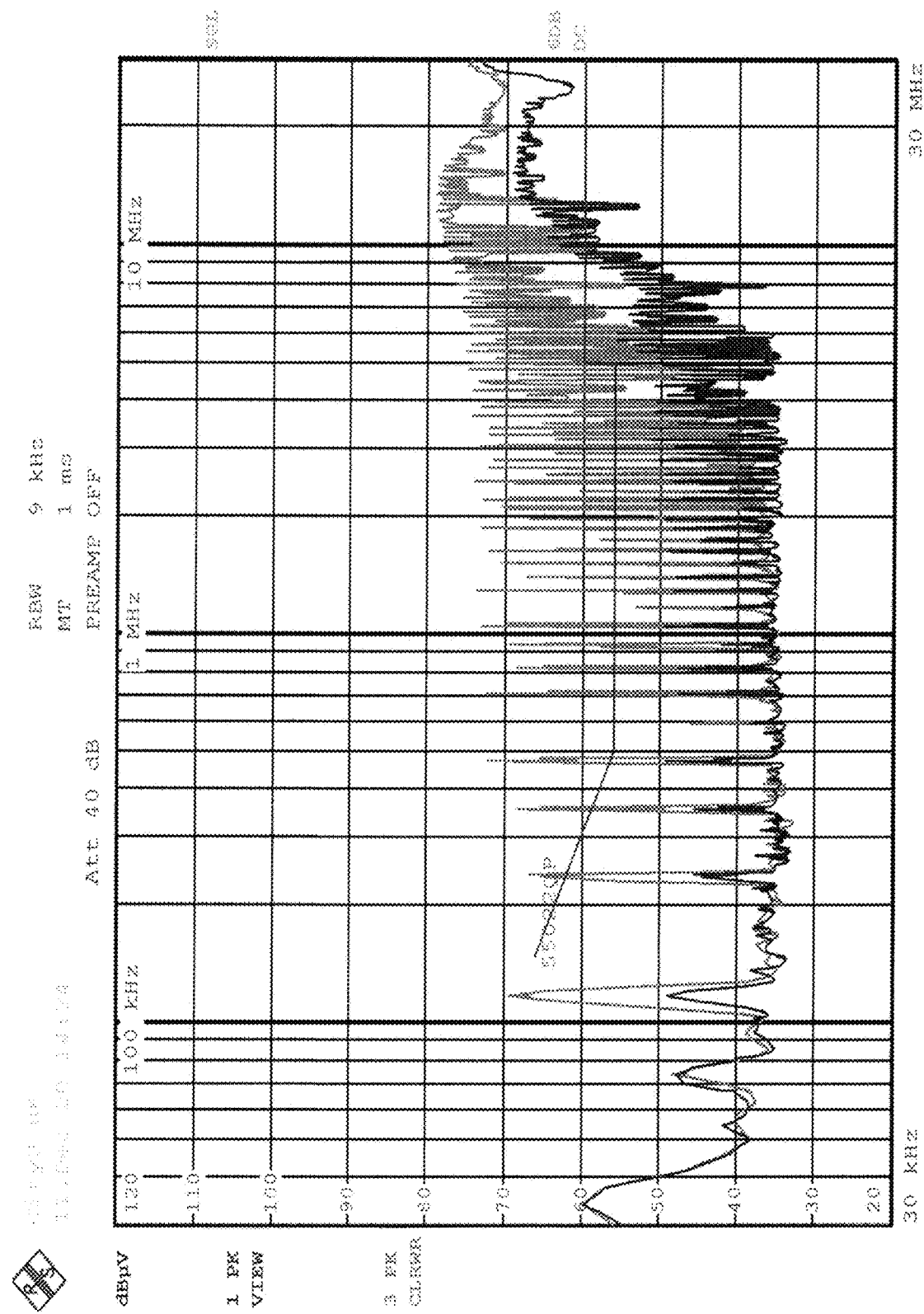
FIG. 13 is a plot showing the conducted common-mode disturbance measurement of the prototype shown in FIG. 4B.

FIG. 13 is a plot showing the conducted common-mode disturbance measurement of the prototype shown in FIG. 4B. There is no common mode choke. The trace with higher amplitude shows the disturbance spectrum measured with the sync-shunt disabled, i.e., there is only a passive shunt capacitor $C_Y$. The trace with lower amplitude shows the disturbance spectrum measured with the sync-shunt enabled. The conducted CM disturbance is reduced effectively with the proposed invention.

Figure 14:
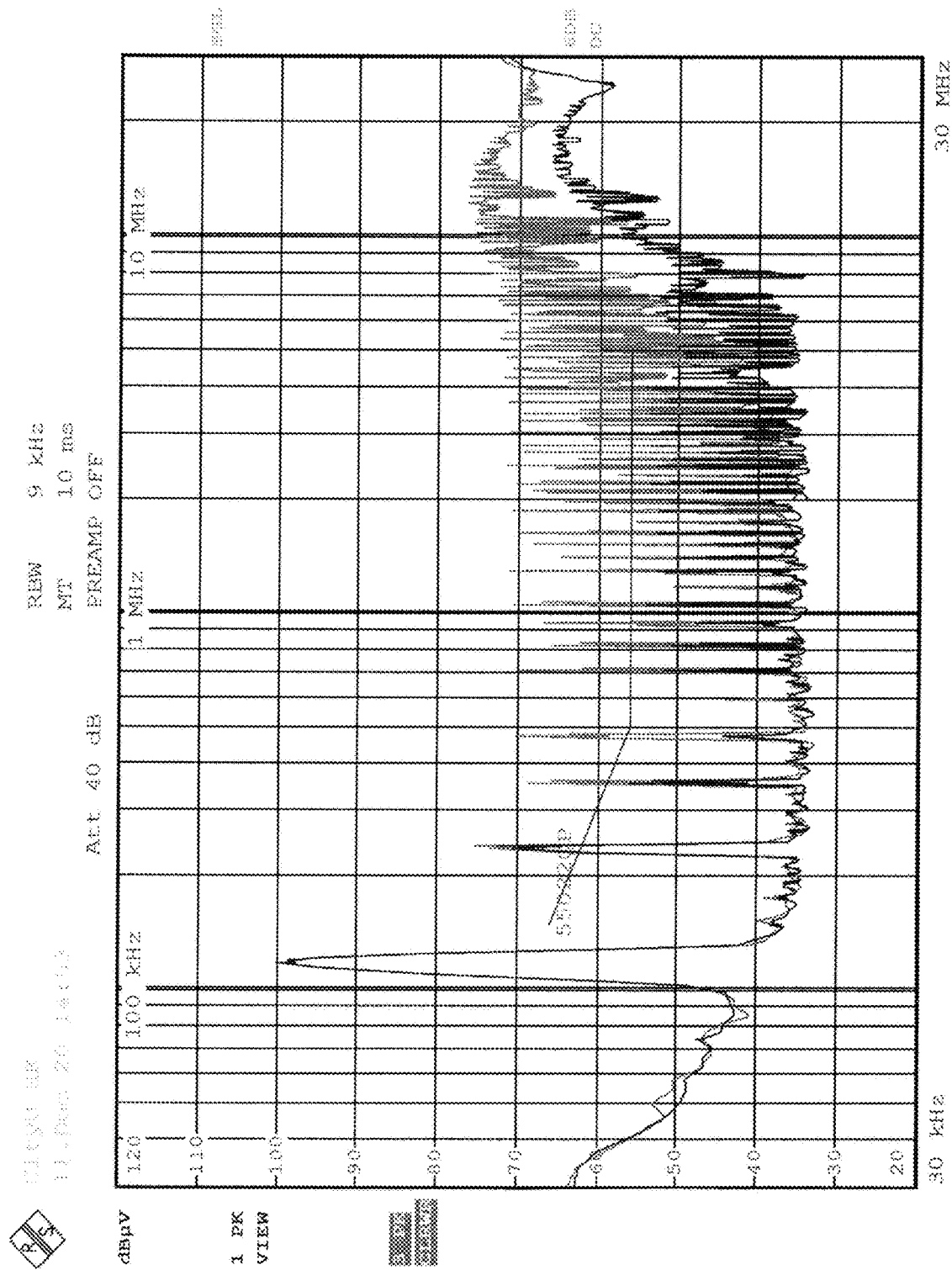
FIG. 14 is the total conducted disturbance measurement of the prototype shown in FIG. 4B.

FIG. 14 is the total conducted disturbance measurement of the prototype shown in FIG. 4B. There is no common mode choke. The trace with higher amplitude in most frequencies shows the disturbance spectrum measured with the sync-shunt disabled, i.e., there is only a passive shunt capacitor $C_Y$. The trace with lower amplitude shows the disturbance spectrum measured with the sync-shunt enabled. The conducted disturbance is reduced significantly in most of the frequencies with the presented invention enabled. At lower frequencies (<300 kHz), the reduction is not significant because the differential-mode disturbance dominates. The proposed sync-shunt in the corresponding embodiment is a common-mode filter component.

It will be appreciated by persons skilled in the art that numerous variations and/or modifications may be made to the invention as shown in the specific embodiments without departing from the spirit or scope of the invention as broadly described. The described embodiments of the invention should therefore be considered in all respects as illustrative, not restrictive.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An electrical circuit for reducing electromagnetic noise or interference in a power converter, comprising at least one shunt capacitor arranged to connect with a grounded component of the power converter, wherein the at least one shunt capacitor is further arranged to be driven by an active control signal so as to sink a noise current originating from a noise source to the grounded component of the power converter, wherein the noise source is connected to the grounded component via a capacitive path formed by at least one stray capacitor; and wherein the active control signal is synchronized substantially to the noise current.

2. The electrical circuit of claim 1, wherein the noise source includes an electrical power converter stage.

3. The electrical circuit of claim 2, wherein the electrical power converter stage includes at least one switching converter.

4. The electrical circuit of claim 3, wherein the at least one stray capacitor is connected between a switching node of each of the at least one switching converter and the grounded component.

5. The electrical circuit of claim 4, wherein the electrical power converter stage comprises a plurality of switching converters, wherein the capacitive path is formed by a plurality of stray capacitors each being individually formed between a switching node of each of the plurality of switching converters and the grounded component.

6. The electrical circuit of claim 3, wherein a total number of shunt capacitors equals to a total number of switching converters in the electrical power converter stage.

7. The electrical circuit of claim 3, wherein noise current $I_Y$ sunk by the at least one shunt capacitor substantially matches with at least one noise current pulse $I_N$ generated by the at least one switching converter during an operation of the power converter.

8. The electrical circuit of claim 7, wherein the noise current $I_Y$ includes a current waveform substantially matching with the at least one noise current pulse $I_N$.

9. The electrical circuit of claim 7, wherein the at least one shunt capacitor has a capacitance value of CY, and the at least one stray capacitor has a capacitance value of $C_{st}$, and wherein the at least one shunt capacitor is further arranged to be driven at a shunt driver voltage at $V_{cd}$ so as to suppress a noise source voltage of the at least one noise current pulse of $V_{sw}$ at a switching node of the at least one switching converter, following a relationship of $V_{cd}/V_{sw}=-C_{st}/C_Y$.

10. The electrical circuit of claim 3, wherein the at least one shunt capacitor is driven by the active control signal being synchronized to a waveform of a switching node of each of the at least one switching converter.

11. The electrical circuit of claim 10, wherein both the active control signal and the noise current includes substantially aligned rising/falling edges.

12. The electrical circuit of claim 10, further comprising a synchronous shunt driver arranged to provide the active control signal.

13. The electrical circuit of claim 12, wherein the synchronous shunt driver includes a unified controller arranged to control the at least one switching converter and the at least one shunt capacitor in a synchronized manner.

14. The electrical circuit of claim 12, wherein the synchronous shunt driver includes at least one dedicated logic controller each being arranged to control a respective one of the at least one shunt capacitor with respect to a synchronization source.

15. The electrical circuit of claim 14, wherein the at least one dedicated logic controller comprises a synchronizing unit arranged to detect a voltage node associated with the noise source.

16. The electrical circuit of claim 14, wherein each of the at least one dedicated logic controller is further arranged to control a respective one of the at least one switching converter and the respective one of the at least one shunt capacitor in a synchronized manner.

17. The electrical circuit of claim 16, wherein the at least one dedicated logic controller includes an input port arranged to receive a gate signal from a PWM controller, a first output port arranged to drive the shunt capacitor, and a second output port arranged to manipulate the at least one switching converter.

18. The electrical circuit of claim 17, wherein the at least one dedicated logic controller comprises a delay buffer connected between the input port and the first output port.

19. The electrical circuit of claim 17, wherein the at least one dedicated logic controller further comprises a synchronizing unit arranged to detect a voltage node associated with the noise source, and wherein the synchronizing unit comprises a delay circuit and a phase detector connected between the input port and the second output port.

20. The electrical circuit of claim 19, wherein the phase detector comprises a flip-flop and two AND gates.

21. The electrical circuit of claim 19, wherein the delay circuit includes a resistor-capacitor circuit.

22. The electrical circuit of claim 12, wherein the synchronous shunt driver further comprising an interfacing stage arranged to directly drive the at least one shunt capacitor.

23. The electrical circuit of claim 1, wherein the at least one shunt capacitor includes a class-Y safety capacitor.

24. The electrical circuit of claim 1, wherein the grounded component includes at least one of: a chassis, a ground plane, a case, or an earth connector of a power supply rail.

25. The electrical circuit of claim 1, wherein the grounded component is a common ground for one or more components of the power converter.

26. An electrical add-on module for use in a power converter, comprising the electrical circuit in accordance with claim 1.

27. A power converter, the electrical add-on module in accordance with claim 26.

28. The power converter of claim 27, further comprising an electrical power converter stage including at least one switching converter, a PWM controller arranged to control the at least one switching converter, and a chassis and/or an earth connector arranged to operate as the grounded component.

* * * * *